United States Patent [19]
Davis et al.

[11] Patent Number: 6,160,943
[45] Date of Patent: *Dec. 12, 2000

[54] MULTIPLE-CORE OPTICAL FIBERS AND ASSOCIATED COUPLING METHODS

[75] Inventors: Monica K. Davis, Mountain View; Michel J. F. Digonnet, Palo Alto, both of Calif.

[73] Assignee: Board of Trustees for the Leland Stanford Jr. University, Stanford, Calif.

[*] Notice: Under 35 U.S.C. 154(b), the term of this patent shall be extended for 15 days.

[21] Appl. No.: 09/064,363

[22] Filed: Apr. 22, 1998

[51] Int. Cl.$^7$ .............................. G02B 6/16; G02B 6/26
[52] U.S. Cl. ............................................. 385/126; 385/39
[58] Field of Search .............................................. 385/126

[56] References Cited

U.S. PATENT DOCUMENTS

| | | | |
|---|---|---|---|
| 5,566,196 | 10/1996 | Scifres | 372/6 |
| 5,901,261 | 5/1999 | Wach | 385/38 |

FOREIGN PATENT DOCUMENTS

| | | |
|---|---|---|
| 60-212710 | 10/1985 | Japan . |
| 05196845 | 8/1993 | Japan . |

OTHER PUBLICATIONS

G. Schiffner, et al., "Double–Core Single–Mode Optical Fiber as Directional Coupler", *Applied Physics*, vol. 23 pp. 41–45, 1980 (Apr.).

G. Meltz, et al., "Cross–talk fiber–optic temperature sensor", *Applied Optics*, vol. 22, pp. 464–477, 1983 (Feb.).

J.W. Arkwright, et al., "Nonlinear Phase Changes at 1310 nm and 1545 nm Observed Far From Resonance in Diode Pumped Ytterbium Doped Fiber", *IEEE Photonics Technology Letters*, vol. 8 pp. 408–410, 1996 (Mar.).

J. Arkwright, et al., "Enhanced Switching Speeds observed at 980 nm in neodymium doped twin–core fibre, using simulated downpumping at 1060 nm", *Fiber Laser Sources and Amplifiers*, SPIE vol. 2073, pp. 158–165, 1993 (no month).

P.L. Chu, et al., "Optical switching in twin–core erbium–doped fibers", *Optics Letters*, vol. 17, pp. 255–257.

G.D. Peng, et al., "Accurate elasto–optic probe method for measurement of coupling length in twin–core optical fiber", *Applied Optics*, vol. 33, pp. 1004–1010, 1994 (Feb.).

"SELFOC® Product Guide", *NSG America, Inc.*, 1996 (Dec.).

*Primary Examiner*—John D. Lee
*Assistant Examiner*—Sarah N Song
*Attorney, Agent, or Firm*—Knobbe, Martens, Olson & Bear, LLP

[57] ABSTRACT

An optical fiber has two or more cores with respective faces on the fiber's ends. The faces are preferably oriented so that optical radiation can be coupled into or out of the individual cores, thereby permitting, for example, optical radiation from the various cores to be spatially resolved in the far field. The faces can be formed on the fiber by polishing the fiber at an angle with respect to the cores, i.e., with respect to the optical paths traversed by the optical radiation passing through the fiber.

12 Claims, 11 Drawing Sheets

MULTIPLE-CORE OPTICAL FIBERS AND ASSOCIATED COUPLING METHODS

BACKGROUND OF THE INVENTION

1. Field of the Invention

The present invention relates to dual-core and multicore optical fibers, and in particular, to the simultaneous accessibility of multiple cores in the same fiber.

2. Description of the Related Art

A dual-core fiber, such as that in the prior art, is depicted in FIGS. 1 and 2. Two cores 12 and 14 within a fiber 16 support respective propagating optical beams 18 and 20. The term "optical beam" is used broadly herein to include electromagnetic radiation propagating in air or space as well as electromagnetic modes propagating in fiber cores. The cores 12 and 14 are surrounded by a cladding 17. The cores 12 and 14 are separated by a center-to-center spacing of d and have respective diameters $a_1$ and $a_2$. The index of refraction of the cladding 17 is lower than the indices of refraction of the cores 12 and 14 so that optical energy is guided within the cores through total internal reflection. If the cores 12 and 14 are made from the same fiber preform, and the fiber drawing is done such that the cores are identical, the fiber 16 is known as a twin-core fiber. Upon reaching the fiber's flat output face 22, optical energy diverges from each of the cores 12 and 14. The maximum angle at which the optical radiation from a core can exit the flat face 22 is related to the core's numerical aperture (NA):

$$NA = \sqrt{n_{co}^2 - n_{cl}^2} \quad (1)$$

in which $n_{co}$ and $n_{cl}$ are the indices of refraction of the core and cladding, respectively.

The range of angles θ about an axis perpendicular to the output face 22 at which refracted rays may exit can be determined with Snell's law to be:

$$|\theta| \leq \sin^{-1} \frac{NA}{n_{ext}} \quad (2)$$

in which $n_{ext}$ is the index of refraction of the medium, e.g., air, into which the beams 18 and 20 propagate. This range of angles θ is illustrated in FIG. 1 with marginal rays 24 and 26 for the core 12 and marginal rays 28 and 30 for the core 14. The beams 18 and 20 spatially overlap in the far field, where an interference fringe pattern may be formed if the two beams are mutually coherent at the output face 22. Thus, the powers in the cores 12 and 14 cannot be individually monitored, unless the fiber 16 is physically split between the cores 12 and 14 so that the cores are separated from each other as illustrated in FIG. 2. (See, for example, G. Schiffner, et al., "Double-Core Single-Mode Optical Fiber as Directional Coupler," *Applied Physics*, Vol. 23, pp. 41–45, 1980.) Likewise, the input end of the fiber 16 must generally be split to allow separate optical inputs into the cores 12 and 14. To fabricate the fiber 16 depicted in FIG. 2, holes may be drilled in the fiber preform between the two preform cores 12 and 14, at some given spacing. When the fiber 16 is drawn, these holes extend to form the split in the 'Y' depicted in FIG. 2. Physical limitations on the possible spacing of drilled holes in the preform determine the minimum length of dual-core fiber 16 which may be connected by two such split and drawn regions. These lengths cannot be controlled to the accuracy needed in some applications, i.e., couplers. In addition, typically, these lengths are fairly long.

Dual-core fibers are of interest because of their use as couplers, wavelength division multiplexers, and sensors. (See, for example, G. Schiffner, et al., supra, 1980; and G. Meltz, et al., "Cross-talk fiber-optic temperature sensor," *Applied Optics*, Vol. 22, pp. 464–477, 1983.) The aforementioned problem with coupling into and out of such fibers has severely limited their application, however. Unless both cores can be simultaneously accessed at both the input end and the output end, a dual-core fiber cannot be used as a practical 2×2 device. Thus, applications to this point have not been able to exploit the full potential of dual-core or multiple-core fibers.

Dual-core fibers are currently used in interferometric measurements in which power is launched into one core of the fiber or split evenly between the cores. (See, for example, J. W. Arkwright, et al., "Nonlinear Phase Changes at 1310 nm and 1545 nm Observed Far From Resonance in Diode Pumped Ytterbium Doped Fiber," *IEEE Photonics Technology Letters*, Vol. 8, pp. 408–410, 1996; J. Arkwright, et al., "Enhanced Switching Speeds observed at 980 nm in neodymium doped twin-core fibre, using simulated down-pumping at 1060 nm," *Fiber Laser Sources and Amplifiers*, SPIE Vol. 2073, pp. 158–165, 1993; and P. L. Chu, et al., "Optical switching in twin-core erbium-doped fibers," *Optics Letters* Vol. 17, pp. 255–257, 1997.) In these switching devices, interference fringes and fringe shifts are used to determine when a relative phase shift has occurred between the fields propagating within the two cores. (See, for example, J. W. Arkwright, et al., 1996, supra, and J. W. Arkwright, et al., 1993, supra). A slit is used to isolate a single output fringe, or a pinhole to isolate a fraction of an output fringe. Thus, a significant portion of the output power is discarded, leading to a lower signal-to-noise ratio in such a measurement. Even coupling measurements for determining the fraction of power coupled from one core of a twin-core fiber to the other core over a fixed distance rely on such an interferometric measurement rather than a direct power measurement. (See, for example, G. D. Peng, et al., "Accurate elasto-optic probe method for measurement of coupling length in twin-core optical fiber," *Applied Optics*, Vol. 33, pp. 1004–1010, 1994.)

Power in one core can be accessed by butt coupling a separate single-core fiber to one of the cores in the dual-core fiber (see, for example, P. L. Chu, et al., supra, 1997), but this requires a cumbersome alignment procedure. There is not enough physical space to butt-couple two single-core fibers side by side onto the same end of a dual-core fiber, so that it is also not possible to couple this way from both cores. Thus, the development of dual-core fibers as four-port devices has been hindered.

SUMMARY OF THE INVENTION

The input and output faces of the cores of a multiple-core fiber are preferably polished in different planes to take advantage of the refractive properties of the glass/external medium (e.g., air) interface. By appropriately choosing the polish angles in accordance with fiber parameters, the separately refracted output beams may be resolved into spatially separated spots. Likewise, spatially separated light sources may be used to simultaneously launch electromagnetic radiation into different cores of a multiple-core fiber. Thus, a multiple-core fiber with N cores may be used for applications requiring up to N distinct input ports and N distinct output ports.

In accordance with the present invention, an optical fiber is provided that includes a plurality of cores surrounded by a cladding, in which the index of refraction of the cladding is lower than the indices of refraction of the cores to confine optical beams within the cores. The cores have respective ends with faces thereon. The faces are oriented with respect to the cores such that at least one of the optical beams is refracted sufficiently strongly by at least one of the faces to allow the optical beams to be spatially resolved. The optical fiber may comprise two or more cores, which may be identical. In one embodiment of the invention, the faces lie in different planes. In a preferred embodiment of the invention, these planes are oriented at Brewster's angle to reduce transmission losses through the fiber. Other embodiments of the invention further comprise at least one optical source for generating the optical beams and at least one detector for detecting the optical beams after they exit the fiber, so that the fiber, optical source, and detector form an optical sensor or an optical coupler. In further embodiments of the invention, optical radiation is coupled from one core into another core to form coupling devices and wavelength division multiplexing devices.

Further in accordance with the present invention, an optical fiber is provided that comprises a cladding and a plurality of cores within the cladding, in which the indices of refraction of the cladding and the indices of refraction of the cores are chosen such that optical radiation propagating within the cores is substantially restricted to propagating along optical paths that pass through the cores and the ends of the cores. At least one end of one of the cores is oriented with respect to the optical path through that core such that optical radiation is refracted, permitting optical radiation propagating through different cores to be spatially resolved. In one embodiment, at least one of the ends has a concave shape to refract optical radiation at different angles. In another embodiment, at least one of the ends has a convex shape.

Still further in accordance with the invention, an optical fiber is provided that comprises a cladding having an index of refraction and a plurality of cores surrounded by the cladding, in which the cores have respective indices of refraction. The index of refraction of the cladding is lower than the indices of refraction of the cores to confine one or more optical beams to the cores, the cores having respective first and second ends. Faces formed on at least one of the first and second ends of the cores are oriented with respect to the cores such that at least one optical beam is refractively coupled into at least one of the cores through at least one of the faces.

Another aspect of the invention is a method of imaging optical radiation. The method comprises the step of providing an optical fiber having a cladding and a plurality of cores surrounded by the cladding, wherein the index of refraction of the cladding is lower than the indices of refraction of the cores to substantially confine optical beams to within the cores, in which the cores have respective ends with faces thereon. Faces are formed on at least one of the ends, with the faces being oriented with respect to the cores such that optical beams are refracted at the faces in different directions, allowing the optical beams to be spatially resolved in the far field. In a preferred embodiment, the faces are formed by polishing the end of the fiber. The faces so formed may be either concave or convex. In a preferred embodiment, optical radiation is imaged into each of the cores of the fiber, so that the optical radiation into the cores is spatially resolved. In another preferred embodiment, optical radiation is imaged from each of the cores of the fiber, so that the optical radiation from the cores is spatially resolved. In yet another preferred embodiment, optical radiation is imaged both into and from each of the cores of the fiber, so that the optical radiation into and from the cores is spatially resolved.

DETAILED DESCRIPTION OF THE PREFERRED EMBODIMENT

Figure 1:
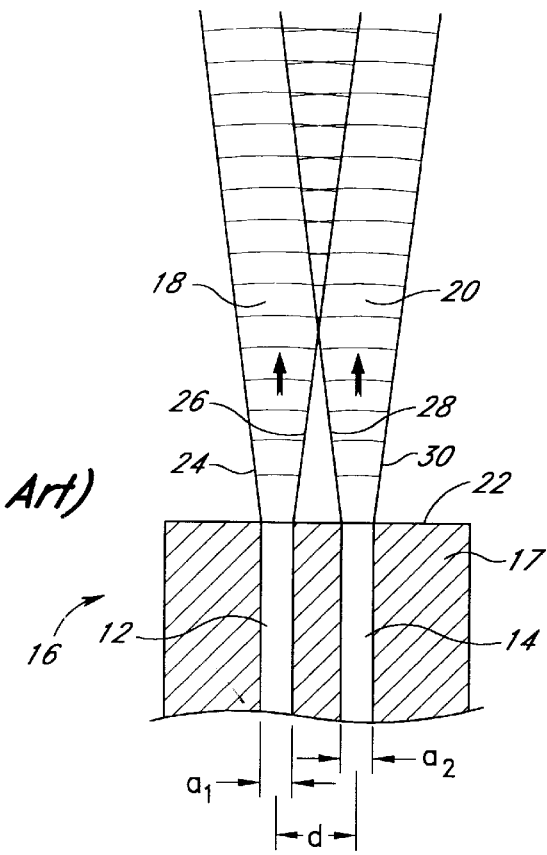
FIG. 1 is a cross-sectional view of a dual-core fiber that is common in the prior art.
Figure 2:
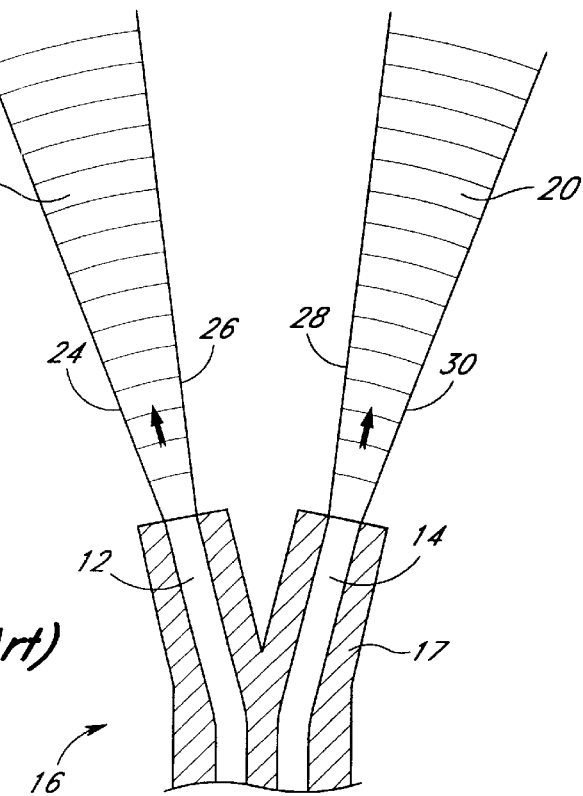
FIG. 2 is a cross-sectional view of a dual-core fiber in the prior art, in which the fiber has been split to separate the cores of the fiber.
Figure 3A:
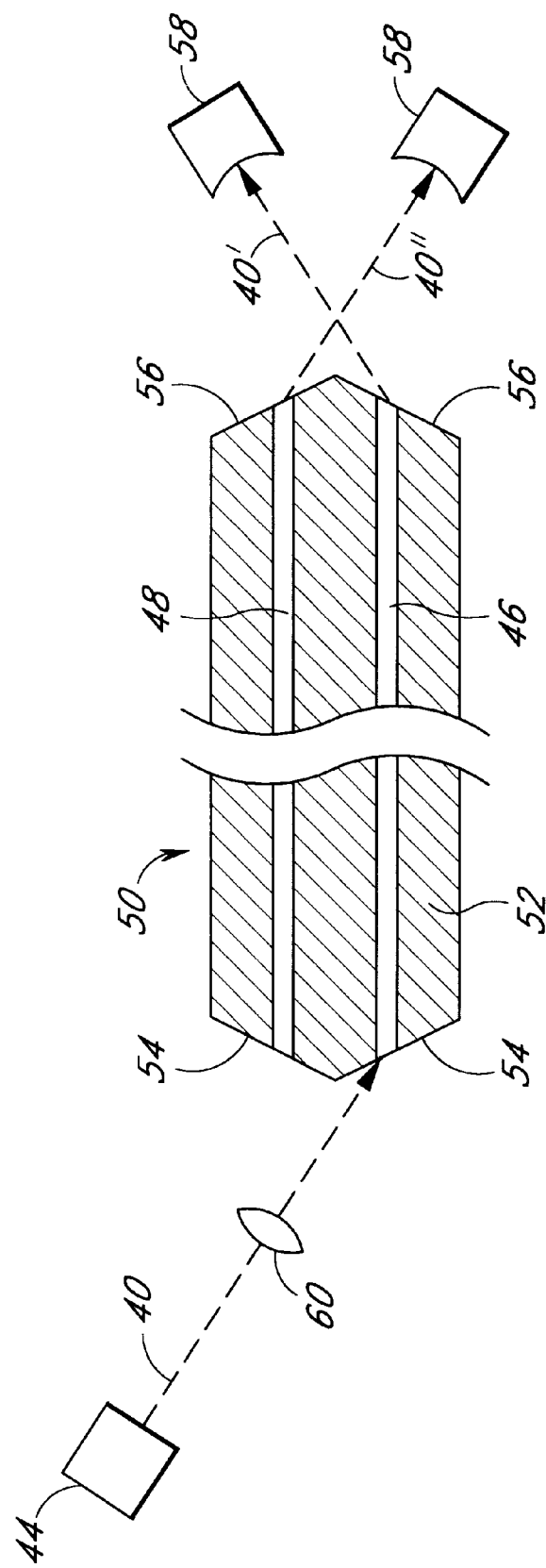
FIG. 3A generalized schematic of one embodiment of the invention, in which an optical signal is refractively coupled into one of the cores of a multiple core optical fiber.

One embodiment of the invention is illustrated in FIG. 3A, in which an optical beam 40 from an optical source 44 (such as a laser diode, a Ti:Sapphire laser, a Nd:YAG laser, or the like) enters, via refraction, a core 46 of an optical fiber 50 (that includes a second core 48), in which the cores 46 and 48 are surrounded by a cladding 52. Alternatively, the optical source 44 may be remotely situated from the optical fiber 50 but optically connected to it using optical means such as a fiber optic link (not shown). The terms "optical" and "light" are used broadly herein to encompass both visible and invisible electromagnetic radiation. For single mode operation in the telecommunications window between 1.3 and 1.55 microns, the cores 46 and 48 may be, for example, 8 microns in diameter with step index profile, have a center-to-center separation of 10–30 microns and have a numerical aperture of 0.12. An optical element such as a lens 60 is preferably used to focus the optical beam 40 onto the core 46. The fiber 50 and the optical element 60 may be aligned using standard alignment apparatuses, for example, micropositioners (not shown). The various components may then remain on the micropositioners or be bonded or otherwise attached to supporting mechanical fixtures (not shown). In the embodiment of FIG. 3A, the optical beam 40 is partially coupled between the cores 46 and 48 and propagates along optical paths within the cores, resulting in two output beams 40' and 40". Thus, the embodiment of FIG. 3A may be used as a coupler.

Upon exiting the output faces 56 of fiber 50, the optical beams 40' and 40" continue to propagate until they reach, for example, one or more detectors 58, which may be silicon or germanium detectors located a few centimeters beyond the fiber 50. As described below, the output faces 56 are constructed so that the beams 40' and 40" can be spatially resolved in the far field, even though they may overlap or cross over each other in the near field. At the output faces 56, optical elements such as GRIN lenses (not shown) may be used to recollimate the exit beams 40' and 40" onto the detectors 58.

Figure 3B:
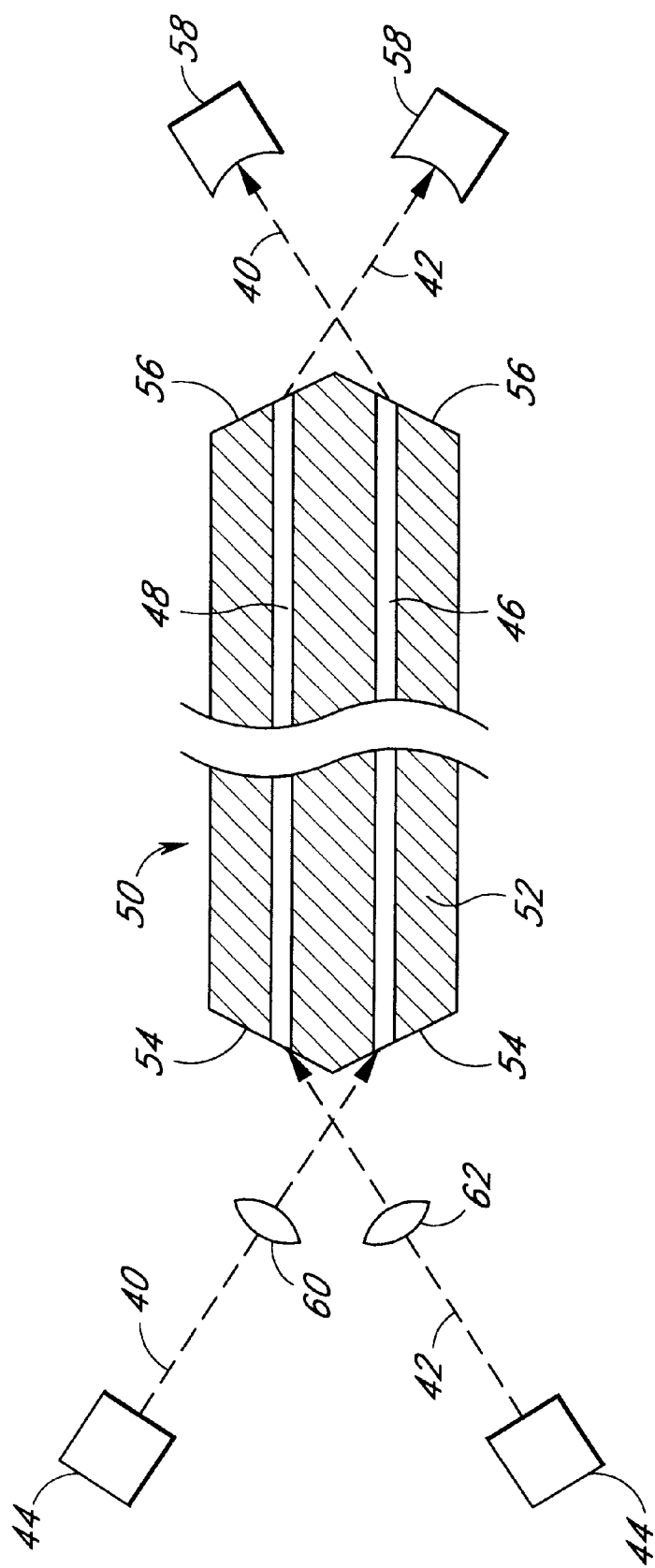
FIG. 3B is a generalized schematic of one embodiment, in which a dual-core fiber acts as a port coupler.

FIG. 3B illustrates another preferred embodiment of the invention that provides independent optical access to each of the cores of a multi-core optical fiber, both at the input and at the output ends of the fiber. That is, light may be launched into multiple cores simultaneously, and/or optical beams emerging from the fiber can be spatially resolved into separate spots. This embodiment includes a dual-core fiber coupling device and may be used for a switching application, for example. In this and the other figures, identical numerals are used to represent analogous elements. Optical beams 40 and 42 emanate from one or more optical sources 44 and enter, via refraction, respective cores 46 and 48 of an optical fiber 50, in which the cores 46 and 48 are surrounded by a cladding 52. As in FIG. 3A, the optical sources 44 may be remotely situated from the optical fiber 50 but optically connected to it using optical means such as one or more fiber optic links (not shown). Input faces 54 at one end of the fiber 50 (the front end) are constructed to permit the cores 46 and 48 to be individually accessed. In this and other embodiments disclosed herein, optical radiation may be butt-coupled directly into the cores. More preferably, however, optical elements such as lenses 60 and 62 may be used to focus the optical beams 40 and 42 onto the individual cores 46 and 48. As discussed above in connection with FIG. 3A, the various optical components may be fixed, for example, within respective mechanical mounts resting upon respective translation stages to control the alignment of the optical beams 40 and 42, which propagate along optical paths within the cores 46 and 48.

The lenses 60 and 62 may be any type of focusing optical elements, such as Fresnel lenses, single optical lenses, doublets, triplets, or even transparent spheres placed or fixed at the input end and/or output end of fiber 50, but are preferably gradient index (GRIN) lenses, such as those produced under the trade name SELFOC by NSG America, Inc. As used herein, the term lens may refer to either one kind of lens or a combination of lenses. The lenses 60 and 62 must be close enough to the fiber 50 that the beams 40 and 42 can be efficiently coupled into the cores 46 and 48. If GRIN lenses are used, they typically have a diameter between 0.3 and 4 mm. Thus, in the case of GRIN lenses, the distance from the fiber 50 to the GRIN lenses is on the order of 2–6 mm for a 0.12 numerical aperture twin-core fiber having 4 μm radii cores separated by 20 microns. In general, the transverse dimension of the lenses 60 and 62 is preferably small so that they can be brought into close proximity with each other. The exact location and orientation of the lenses and the distance between them and fiber 50 are determined by ray tracing methods. (See, for example, SELFOC Product Guide, NSG America, Inc., 28 Worlds Fair Drive, Somerset, N.J. 08873.)

As shown in FIG. 3B, the output faces 56 are constructed so that the beams 40 and 42 can be spatially resolved in the far field, even though they may overlap or cross over each other in the near field, thus leading to a four-port device. Optical elements such as lenses may be used at the output faces 56 to recollimate the exit beams 40 and 42 onto the detectors 58. Although FIG. 3B illustrates an embodiment of the invention with respect to a fiber 50 that has two cores, other embodiments work with fibers having three or more cores. Also, other embodiments may provide for independent optical access to the individual cores at just one end of the fiber 50 rather than at both ends. Also, propagation is not restricted to a single direction. Light may be simultaneously launched into either or both ends of the fibers disclosed herein.

Figure 4:
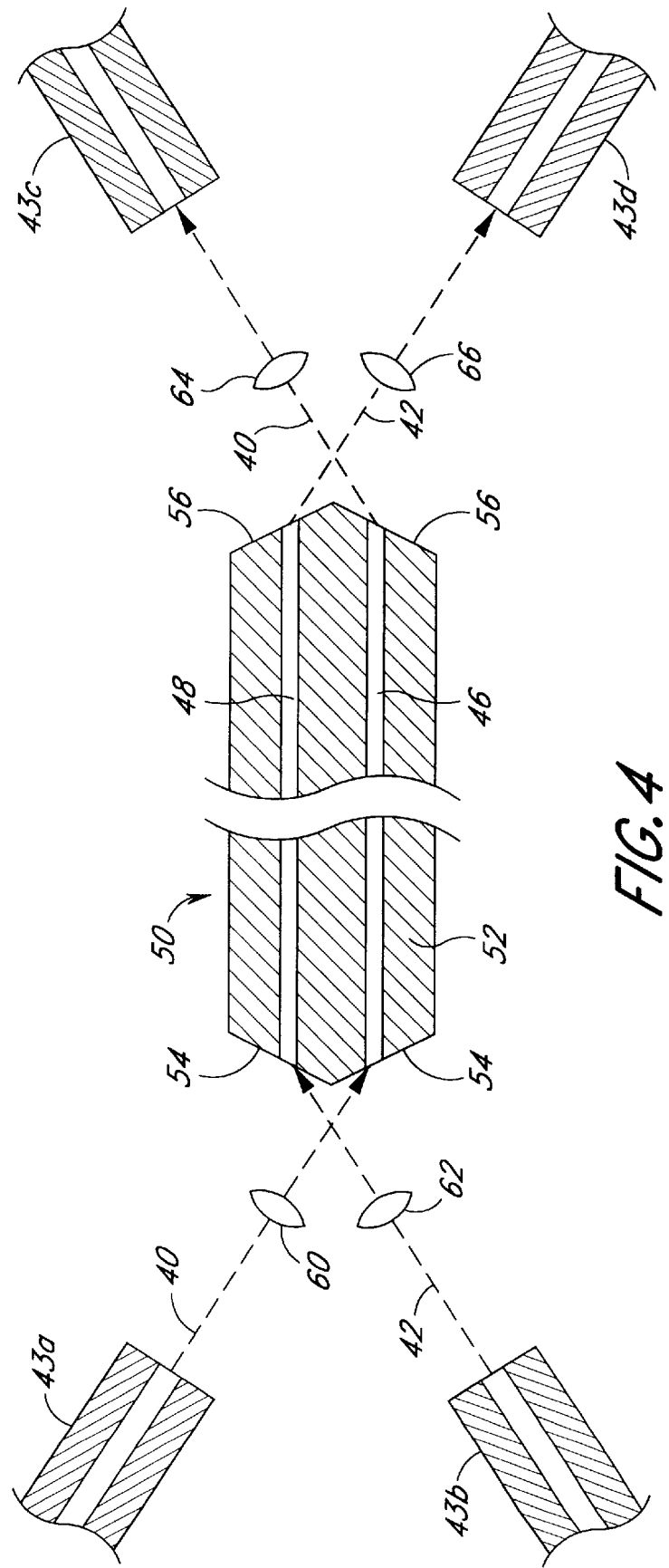
FIG. 4 is a schematic of a 4-port embodiment that can be used as a 2×2 directional coupler.

An embodiment similar to that shown in FIG. 3B is shown in FIG. 4. In this embodiment, however, all the inputs and outputs preferably involve the use of single-core fibers 43*a–d*, or, for example, integrated optics waveguides. Lenses 60 and 62 are used on the input side, and lenses 64 and 66 on the output side, of fiber 50. The embodiment of FIG. 4 thus represents a four-fiber port device in which the twin-core fiber 50 can be used as a 2×2 directional coupler.

Figure 5:
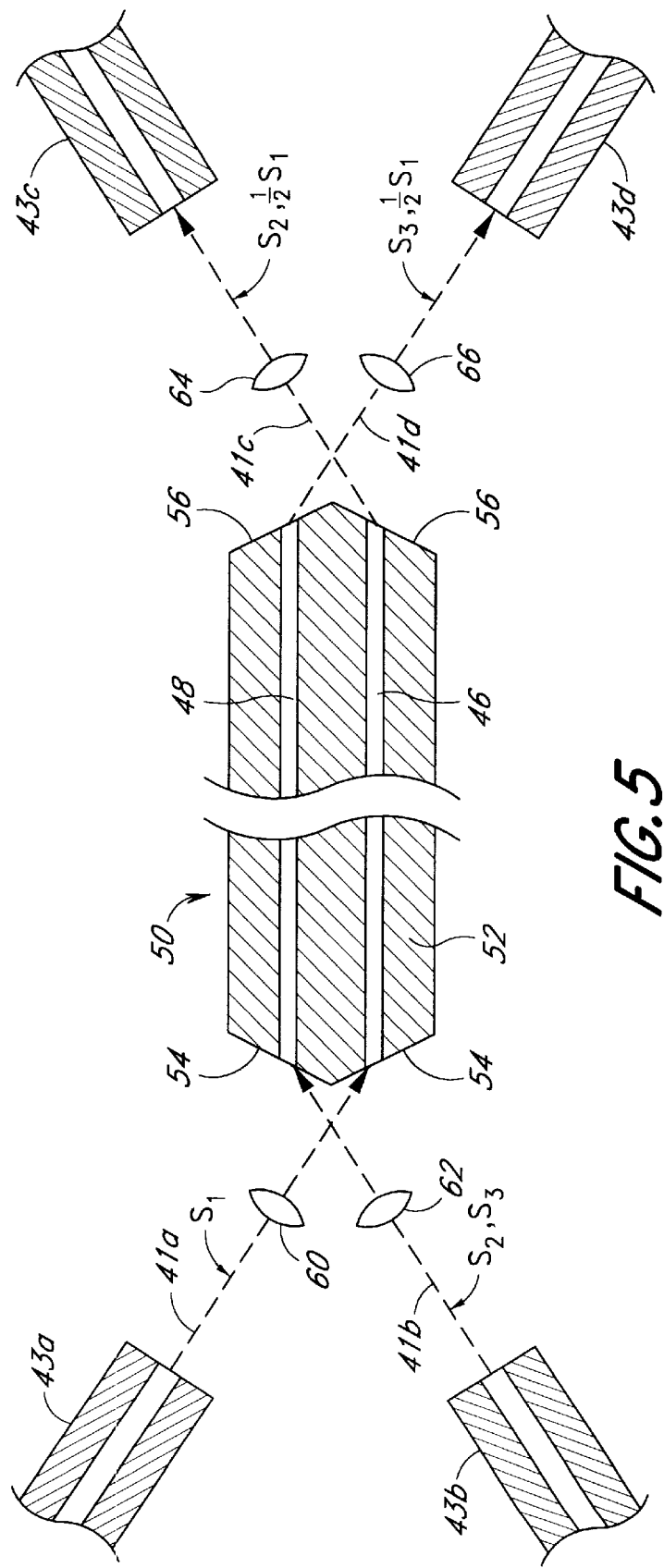
FIG. 5 is a schematic of a 4-port embodiment with coupling and wavelength division multiplexing (WDM) functions.

A similar embodiment can be used as a 1×2 coupler or as a wavelength division multiplexing (WDM) device, and thus as a wavelength-dependent filter, with coupling between the cores 46 and 48 varying between 0 and 100% for a given wavelength and device configuration. This is illustrated in FIG. 5, in which identical numerals are again used to represent analogous elements. In the embodiment of FIG. 5, however, there is not necessarily a one-to-one correspondence between input optical beams 41*a* and 41*b* with output optical beams 41*c* and 41*d*. For example, the optical fiber 50 may be designed so that the optical beam 41*a* is coupled between the core 46 and the core 48. This is illustrated in FIG. 5 for the case of a first spectral component (designated by $S_1$), in which, by appropriate selection of the fiber length and core spacing, half of the power is coupled from the core 46 to the core 48, so that the twin-core fiber functions as a 1×2 coupler. Wavelength division multiplexing functions are illustrated by considering the propagation of the optical beam 41*b*, which comprises second ($S_2$) and third ($S_3$) spectral components that are then separated in the optical fiber 50. In this case, by design, $S_3$ is not coupled from the core 48, whereas $S_2$ is fully coupled from the core 48 to the core 46. These effects may be achieved by appropriate selection of the coupling lengths within the optical fiber 50, as is well known in the art. As disclosed herein, the various spectral components may either be discrete wavelengths or form part of a spectral continuum.

Figure 6:
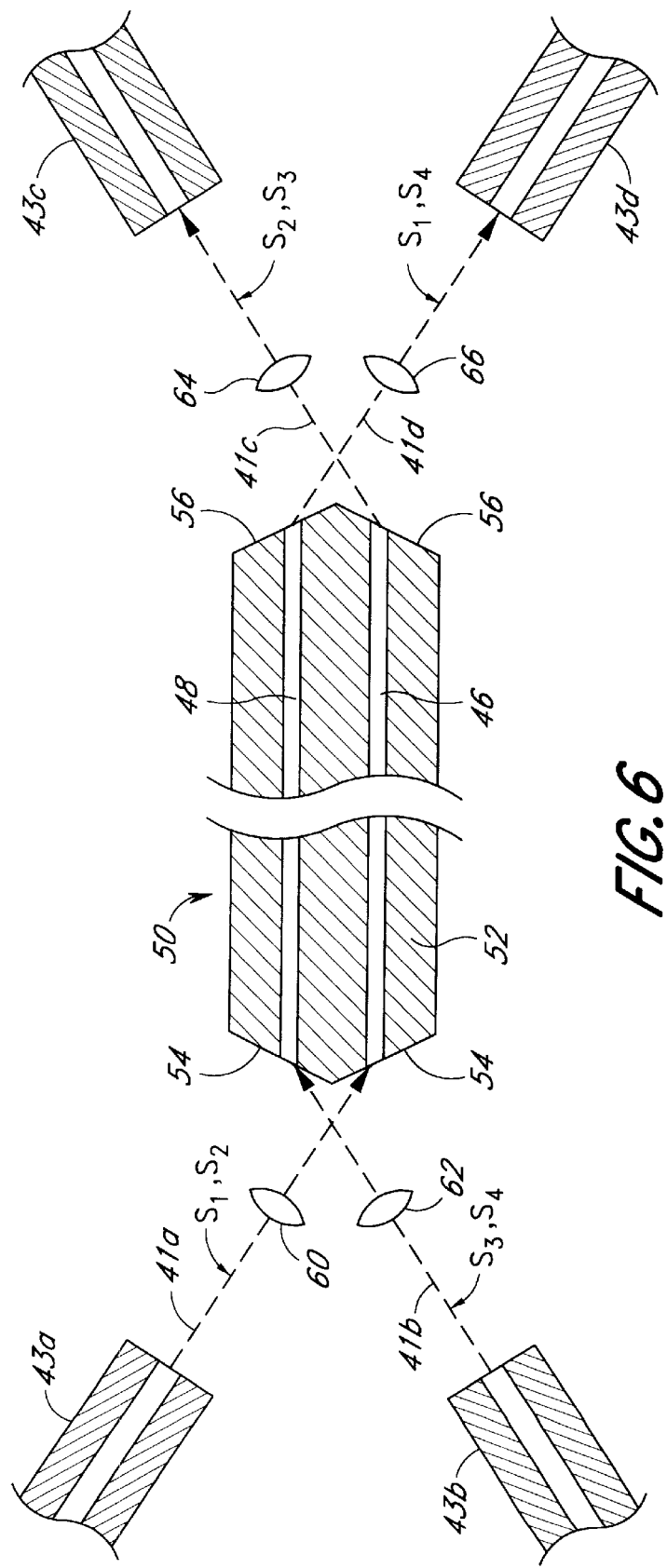
FIG. 6 is a schematic of a 2×2 WDM device.

An exemplary 2×2 WDM embodiment is illustrated in FIG. 6, in which the optical beam 41*a* comprises two inputs, first ($S_1$) and second ($S_2$) spectral components of different wavelengths, whereas the optical beam 41*b* comprises two other inputs, third ($S_3$) and fourth ($S_4$) spectral components. $S_1$ and $S_3$ are fully coupled into their respective adjacent cores, while $S_2$ and $S_4$ are not coupled at all. Thus, all of the signals in this embodiment are either fully transmitted or fully coupled. Other embodiments may use more or fewer signals and/or have coupling ratios between 0 and 100% for a selected signal.

Figure 7:
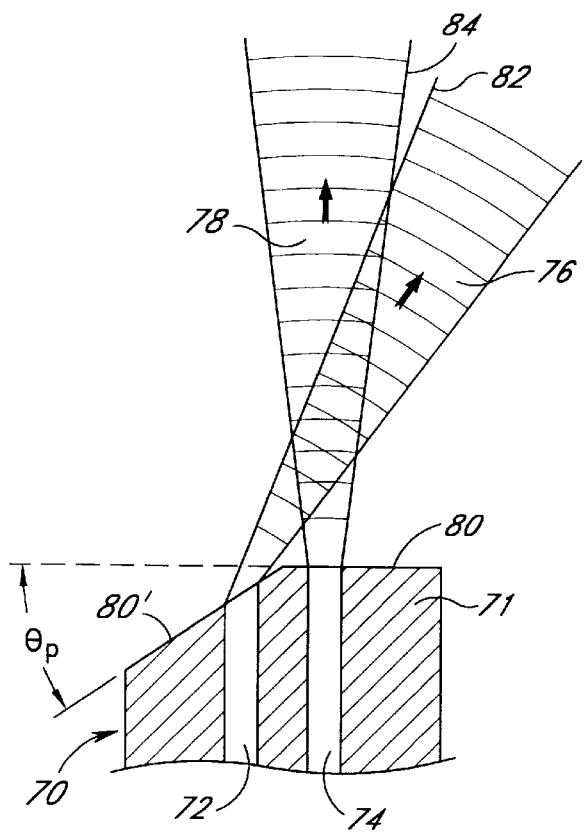
FIG. 7 is a cross-sectional view of an embodiment in which one core of a dual-core fiber has a face polished at an angle with respect to the other core, permitting optical radiation in the two cores to be spatially resolved at the output end of the dual-core fiber.

FIG. 7 illustrates an embodiment of the invention with respect to a dual-core fiber in a medium such as air. A fiber 70 has a cladding 71 and two cores 72 and 74 which are polished in different planes. Optical beams 76 and 78 propagate along optical paths within the cores 72 and 74 and through the fiber 70 to air interfaces 80 and 80' (more generally, the interfaces between the fiber and the external medium), where the beams are refracted at different angles. The end of the fiber 70 is prepared (e.g., polished) so that core 72 is at an angle $\theta_p$ with respect to the rest of the output face. The angle $\theta_p$ shown in FIG. 7 is chosen to be large enough that the optical beams 76 and 78 do not overlap in the far field, permitting them to be spatially resolved. Likewise, this embodiment and the other embodiments disclosed herein can be configured to accept spatially resolved input optical beams (see FIGS. 3B and 4). The minimum angle $\theta_p$ required to resolve the beams 76 and 78 can be derived by noting that this requirement is equivalent to marginal rays 82 and 84 intersecting at some finite distance from the fiber 70. If the cores 72 and 74 have the same numerical aperture, then, as can be shown with the help of Snell's law, $\theta_p$ must satisfy the following:

$$\theta_p > \tan^{-1}\left(\frac{2NA}{n_{cl} - \sqrt{n_{ext}^2 - NA^2}}\right) \quad (3)$$

in which $n_{cl}$ is the index of refraction of the cladding 71. The result in Equation 3 is independent of the core radii as well as the core-to-core separation. On the other hand, the angle $\theta_p$ must not be so great that total internal reflection occurs at the fiber to air interface 80'. This requites that:

$$\theta_p < \sin^{-1}\left[\frac{n_{ext}}{n_{cl}^2 + NA^2}\left(n_{cl} - \sqrt{\frac{NA^2 + n_{cl}^2 - 1}{n_{ext}^2}} NA\right)\right] \quad (4)$$

which is a result that applies to all configurations and beam polarizations.

Figure 8:
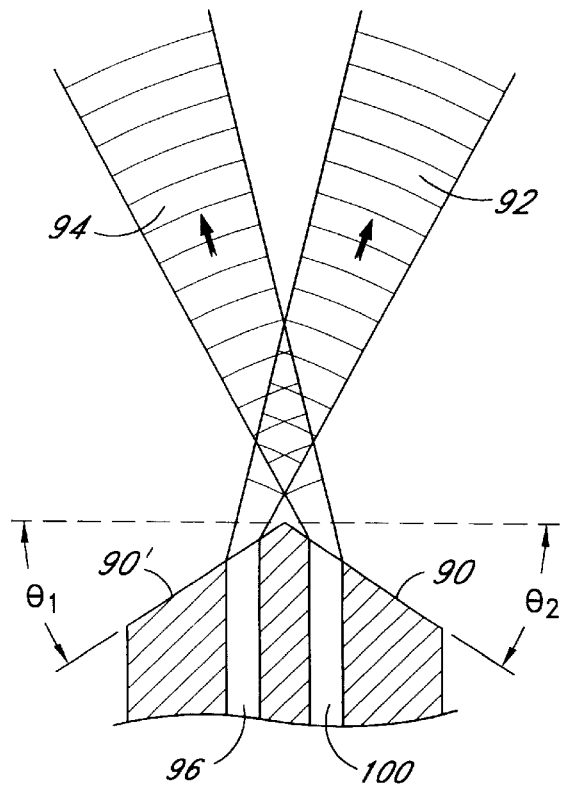
FIG. 8 is a cross-sectional view of another embodiment in which one end of a dual-core fiber,as been polished to form faces which define an apex.

As indicated in FIG. 8, interfaces 90 and 90' may be polished in more than one plane that is not nominally perpendicular to the direction of propagation of optical radiation, e.g., the optical beams 92 and 94 (corresponding to cores 96 and 100, respectively) may each be separately refracted at the fiber to air interfaces. While FIG. 8 depicts a symmetrical polished configuration ($\theta_1=\theta_2=\theta_p$), the two cores may be polished at separate angles, $\theta_1 \neq \theta_2$. The minimum angle $\theta_p$ required to spatially resolve the beams 92 and 94 for the symmetrical configuration of FIG. 8, assuming equal numerical apertures for the cores 96 and 100, is given by equation (5)

$$\theta_p > \tan^{-1}\left[\frac{NA}{n_{cl} - n_{ext}}\right] \quad (5)$$

whereas the maximum angle is given by equation (4).

Polish angle requirements may also be derived for asymmetrical configurations and for fibers with unequal numerical apertures.

In general, reflection losses at an interface depend upon the incident state of polarization relative to the interface, the angle of incidence, and the various indices of refraction. In the case of an appropriately oriented linearly polarized (LP) mode analogous to TM (transverse magnetic) polarized optical radiation, for example, the interfaces 90 and 90' may be polished at Brewster's angle (i.e., $\theta_p$ is approximately 34 degrees for a silica-to-air interface) so that the beams 92 and 94 experience essentially no reflection loss at the interfaces.

Thus, in order to obtain no reflection loss for the special case of TM polarized optical radiation, the numerical aperture of the cores 96 and 100 must be such that Brewster's angle falls within the range of angles bracketed by equations (4) and (5). This condition is satisfied for a wide range of $n_{ext}$ values, in particular in the case of air ($n_{ext}=1$).

Figure 9:
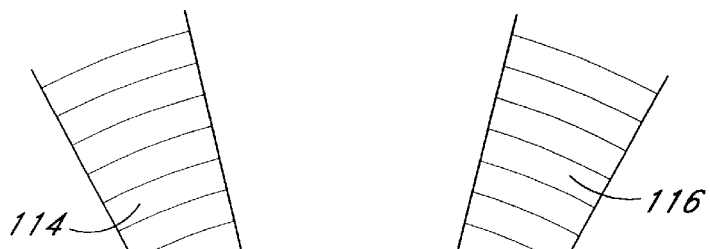
FIG. 9 is a cross-sectional view of an embodiment in which faces at one end of a dual-core fiber define a concave shape that allows optical radiation in the cores to be spatially resolved.
Figure 10:
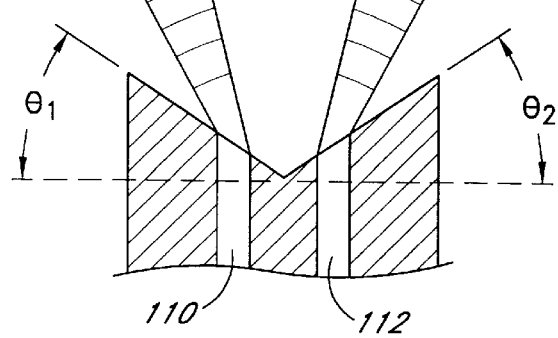
FIG. 10 is an elevational view of an embodiment in which one end of a dual-core fiber has been polished to a conical shape, permitting spatial resolution of radiation in the two cores in the far field.
Figure 10:
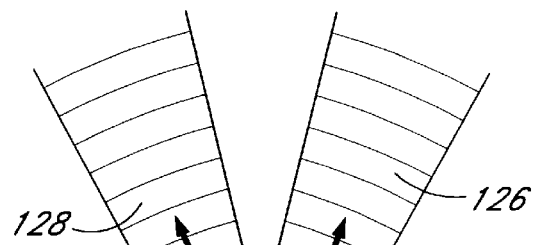

Other angular configurations for dual-core fibers are illustrated in FIGS. 9 and 10. FIG. 9 illustrates how a concave angle polish between two cores 110 and 112 results in separation of their respective optical beams 114 and 116 with no crossover of their beams, in contrast to the convex shaped embodiment of FIG. 8. (The terms "concave" and "convex" are used broadly herein to include both smooth or grooved surfaces.) The minimum angle requirement for the special case of $\theta_1=\theta_2$ is once again given by equation (5).

FIG. 10 illustrates how a convex conical polish on a fiber 120 containing cores 122 and 124 results in separation of their respective optical beams 126 and 128. This configuration is especially useful for fibers containing more than two cores, although the conical polish introduces astigmatism into the beams 126 and 128 as they exit fiber 120, as well as into beams entering the fiber. In another embodiment similar to that shown in FIG. 10, a concave conical polish onto a fiber separates the optical beams in a manner similar to the manner of the embodiment of FIG. 9.

Figure 11:
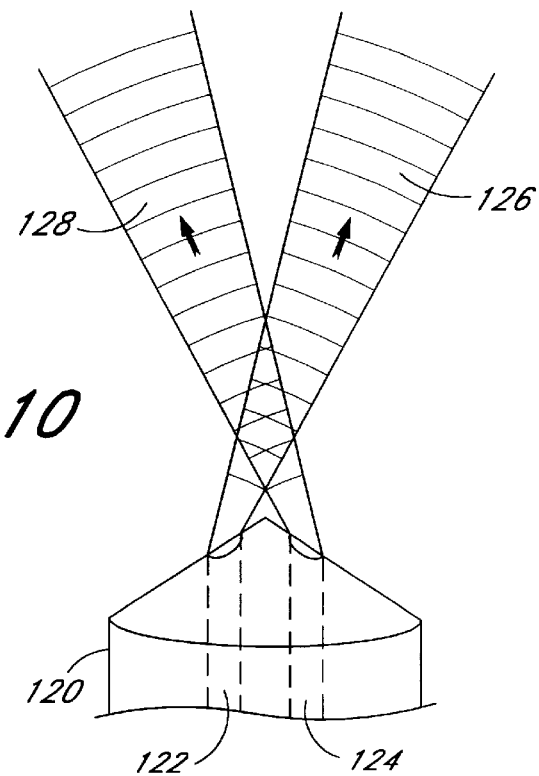
FIG. 11 is a plan view of a three-core generalization of the embodiment shown in FIG. 8.
Figure 11:
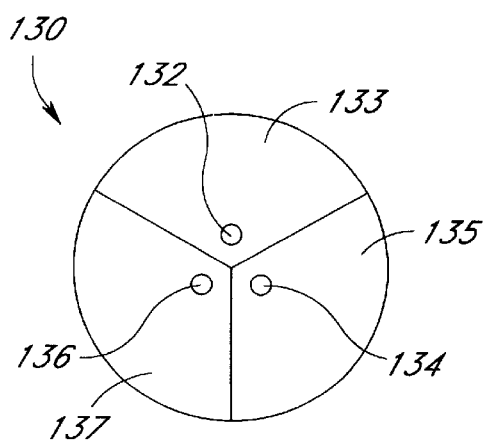

FIG. 11 shows the technique extended to fibers having more than 2 cores. A fiber 130 is shown having three cores 132, 134, and 136 with respective polish planes 133, 135, 137, although in principle the fiber may include an arbitrary number of cores. Although neither the polish angles nor the numerical apertures of cores 132, 134, and 136 need be identical, incorporating such identical features into a design does result in advantageous symmetries with respect to throughput losses, as discussed above in connection with the embodiment shown in FIG. 8. For all embodiments herein, the appropriate angle $\theta_p$ can be determined through ray tracing and application of Snell's law.

Figure 12:
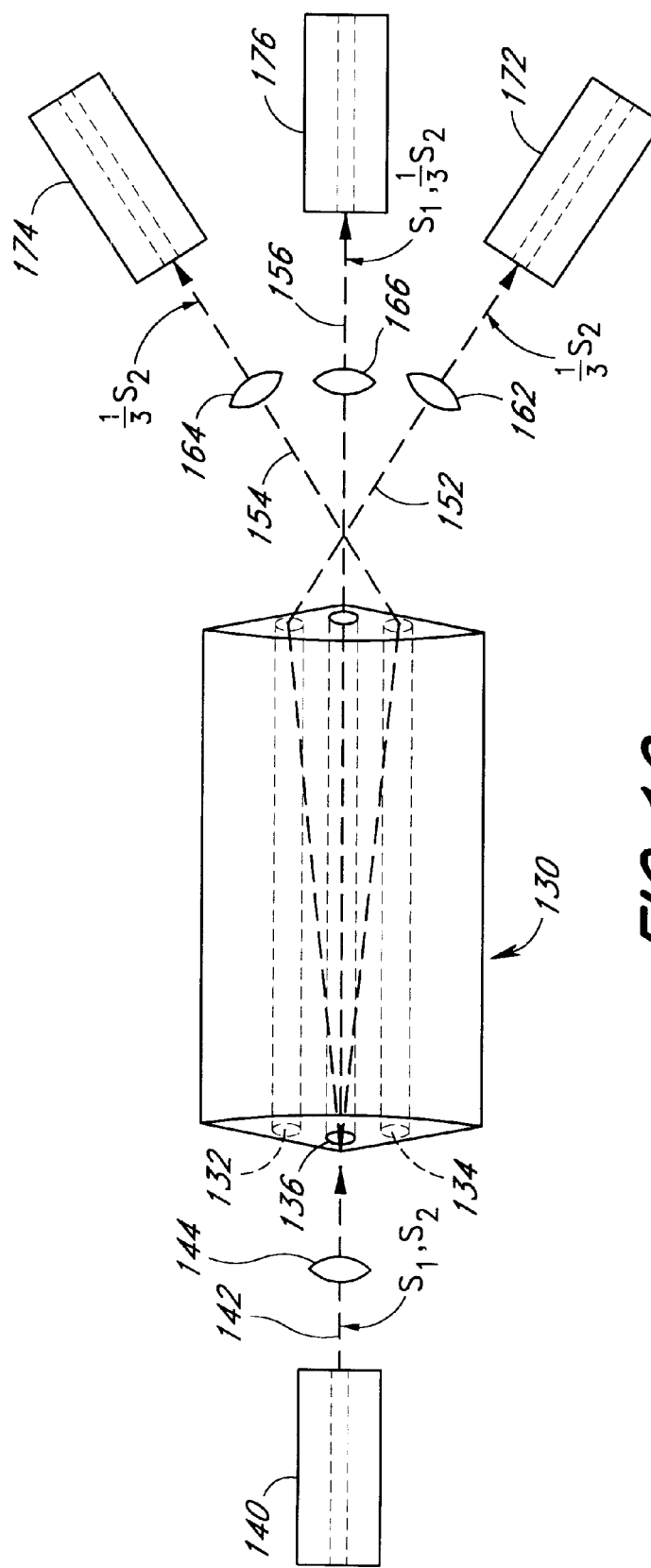
FIG. 12 is a schematic of a 1×3 WDM coupling device using the three-core fiber of FIG. 11.
Figure 13:
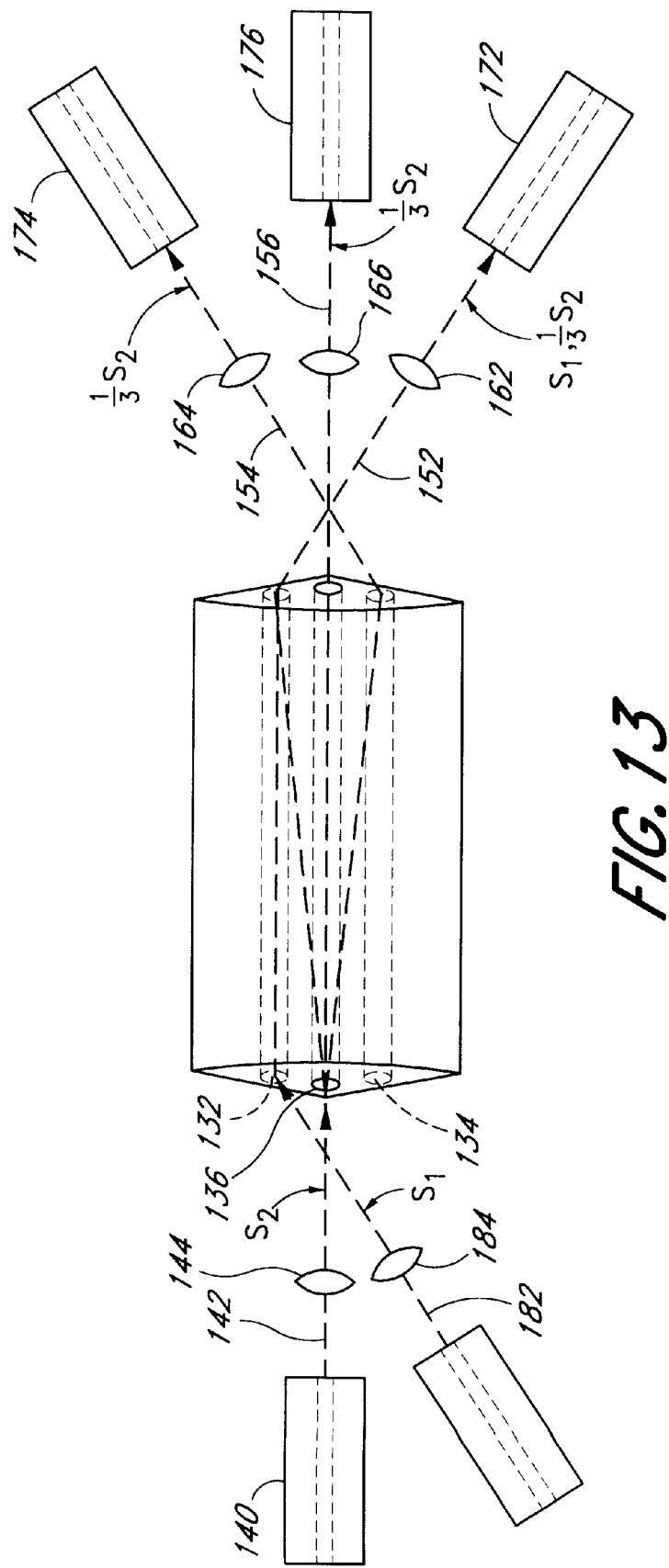
FIG. 13 is a schematic of a 2×3 WDM coupling device using the three-core fiber of FIG 11.

The three-core fiber of FIG. 11 can be used in WDM coupling devices, as shown in FIGS. 12 and 13, in which identical numerals indicate analogous elements. In FIG. 12, a 1×3 WDM device is shown in which a single-core fiber 140 preferably directs an optical beam 142 through a lens 144 into one (e.g., the core 136) of the three cores 132, 134, 136. The optical beam 142 may comprise more than one spectral component, e.g., a first ($S_1$) and a second ($S_2$) spectral component. In the embodiment of FIG. 12, $S_1$ is not coupled into either core 132 or 134, whereas $S_2$ does couple out of the core 136 into the adjacent cores 132 and 134. If the coupling length is chosen appropriately, then at the output end of fiber 130, $S_2$ may be distributed equally between the three cores 132, 134, and 136. Output optical beams 152, 154, and 156, exit from cores 132, 134, and 136, respectively, and preferably pass through respective lenses 162, 164, and 166 before entering respective single-core fibers 172, 174, and 176. In this embodiment, the output optical beams 152 and 154 comprise only $S_2$, whereas optical beam 156 comprises both $S_1$ and $S_2$.

A 2×3 WDM device is shown in FIG. 13, in which a separate and additional optical beam 182 comprising $S_1$ is preferably directed through a lens 184 and into the core 132. In this embodiment, the optical beam 142 consists of only $S_2$. The optical beam 182 enters the core 132 and does not couple into the adjacent cores 134 and 136, whereas the optical beam 142 is divided between the three cores 132, 134, and 136, as in the embodiment of FIG. 12.

Figure 14:
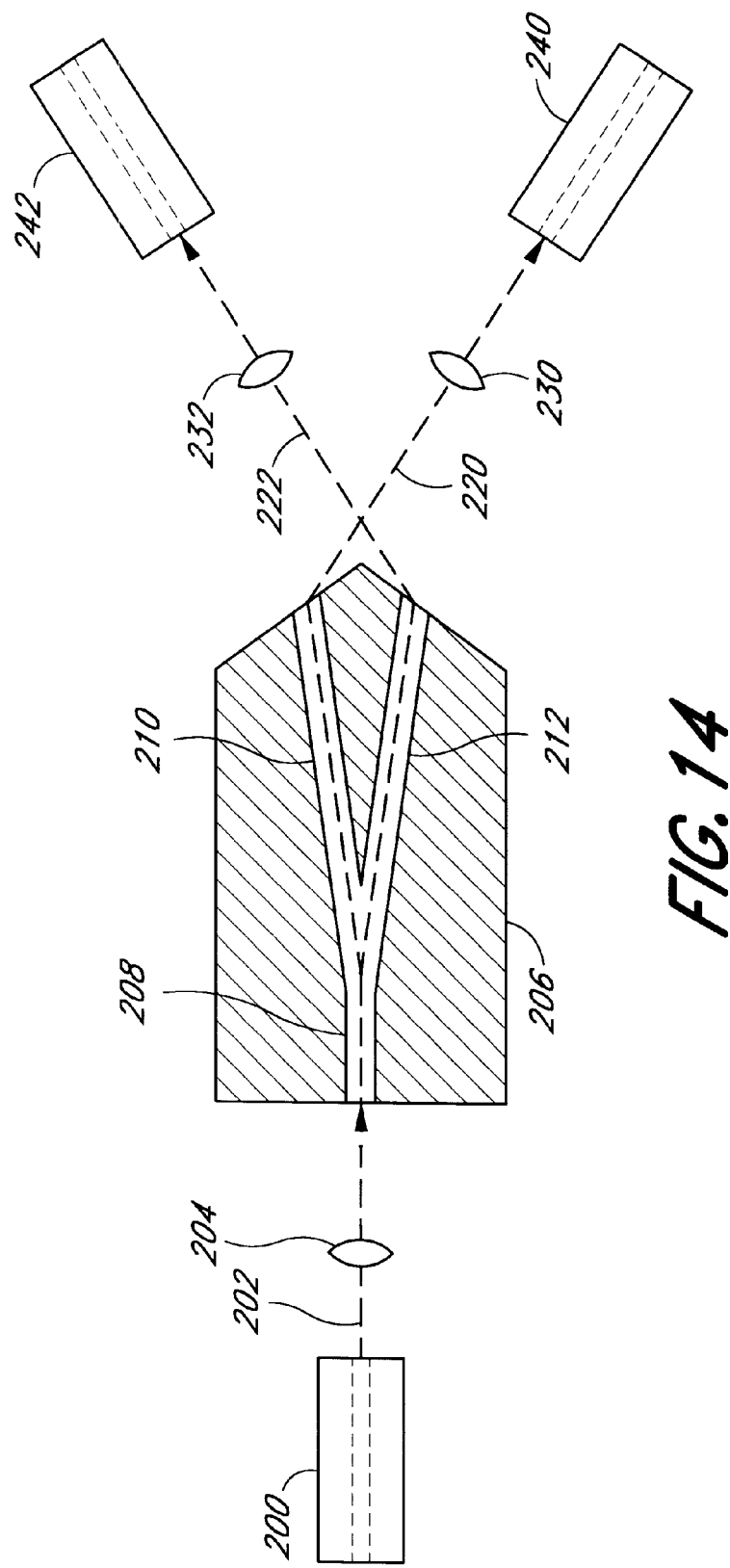
FIG. 14 is a cross section of a Y-coupling embodiment that functions as a 1×2 coupler.

A Y-core configuration is shown in FIG. 14, in which a single-core fiber 200 preferably directs an optical beam 202 through a lens 204 and into an optical fiber 206 of Y-geometry. In the fiber 206, a single core 208 splits into two cores 210 and 212 which are polished at an angle at their ends to refract output optical beams 220 and 222. The beams 220 and 222 preferably pass through lenses 230 and 232 and into single-core fibers 240 and 242. The other embodiments of this invention may likewise include Y-core geometries. Although the embodiment of FIG. 14 is illustrated as a 1×2 coupler, it can be used as a 2×1 coupler by reversing the input and output ends. Likewise, the other n×m coupler and WDM embodiments of this invention can be used as m×n devices. In general, the number of cores in a fiber determines the number of potential inputs and outputs.

The embodiments described herein may be fabricated by mounting a fiber in a ferrule or capillary tube and by bringing the fiber into contact with a fiber polisher. Typically, a relatively coarse grit is used initially, and increasingly fine grits are used to complete the polishing process. To produce a polished plane on a fiber (e.g., FIG. 11), the fiber is brought into contact with a rotating fiber polisher (e.g., a sandpaper wheel), whereas a conical fiber polish (e.g., FIG. 10) can be made by rotating a fiber in a lathe and bringing it into contact with a stationary fiber polisher.

As illustrated in FIG. 3B, the invention described herein can be used with spatially separated power inputs and outputs of a dual-core fiber (e.g., a four-port device) or with a multi-core fiber containing more than two cores, thereby lending itself to coupling and interferometry applications. At the input faces 54, power can be launched simultaneously into both cores 46 and 48 in any chosen ratio. At the output faces 56, the entire amount of power in the optical beams 40 and 42 can be collected, resulting in measurements with a greater power and thus greater signal-to-noise ratio. An angled polish on the faces 54 and 56 means that back reflections are reflected off-axis, thus reducing optical feedback. If the optical sources 44 are polarized, the faces 54 and 56 may be oriented at Brewster's angle to substantially reduce reflection losses.

While it is relatively simple to align the incident polarization of a polarized optical beam with respect to a polished input face of a dual or multicore fiber, there may be loss at the output face if the polarization of the optical beam changes (e.g., due to variations in the stress distribution in the fiber, fiber temperature, etc.) since the beam polarization at the output face may no longer be aligned with the output face's (Brewster) angle. This problem can be mitigated by using polarization maintaining fiber so that the polarization remains properly aligned relative to the output face. This is especially important in devices requiring long lengths of dual-core fiber, such as sensors or interferometers, in which the polarization would evolve significantly in non-polarization-maintaining fiber. This is less of a concern in a device using a shorter segment of fiber, such as a coupler, in which the polarization would not be expected to evolve significantly over time from end to end.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes which come within the meaning and range of equivalency of the claims are to be embraced within that scope.

What is claimed is:

1. An optical fiber, comprising:

a cladding having an index of refraction;

a plurality of cores surrounded by said cladding, said cores having respective indices of refraction, the index of refraction of said cladding being lower than the indices of refraction of said cores to confine optical beams to said cores, said cores having respective first and second ends; and faces formed on at least one of said first and second ends of said cores, said faces oriented with respect to said cores such that at least one of the optical beams is refracted sufficiently strongly at at least one of said faces to allow the optical beams to be spatially resolved away from said at least one end, in which said cladding and said cores are configured such that an optical beam of a discrete wavelength coupled into one of said cores is at least partially coupled into another of said cores as it propagates through said optical fiber.

2. An optical fiber, comprising:

a cladding having an index of refraction;

a plurality of cores surrounded by said cladding, said cores having respective indices of refraction, the index of refraction of said cladding being lower than the indices of refraction of said cores to confine optical beams to said cores, said cores having respective first and second ends; and faces formed on at least one of said first and second ends of said cores, said faces oriented with respect to said cores such that at least one of the optical beams is refracted sufficiently strongly at at least one of said faces to allow the optical beams to be spatially resolved away from said at least one end, in which said cladding and said cores are configured such that a portion of a multi-wavelength optical beam coupled into one of said cores is at least partially coupled into a core other than said one of said cores, wherein the coupled portion represents at least one of the wavelengths in the multi-wavelength optical beam.

3. An optical fiber, comprising:

a cladding having an index of refraction; and a plurality of cores within said cladding, said cores having respective indices of refraction, the indices of refraction of said cladding and said cores chosen such that optical radiation propagating within said cores is substantially restricted to propagating along optical paths that pass through said cores, said cores having ends, an end of at least one of said cores oriented with respect to at least one of said optical paths such that optical radiation passing through said cores is refracted at said end of said at least one of said cores, permitting optical radiation propagating through different cores to be spatially resolved, in which an optical beam of a discrete wavelength coupled into one of said cores is at least partially coupled into another of said cores as it propagates through said optical fiber.

4. An optical fiber, comprising:

a cladding having an index of refraction; and a plurality of cores within said cladding, said cores having respective indices of refraction, the indices of refraction of said cladding and said cores chosen such that optical radiation propagating within said cores is substantially restricted to propagating along optical paths that pass through said cores, said cores having ends, an end of at least one of said cores oriented with respect to at least one of said optical paths such that optical radiation passing through said cores is refracted at said end of said at least one of said cores, permitting optical radiation propagating through different cores to be spatially resolved, in which said cladding and said cores are configured such that a portion of a multi-wavelength optical beam coupled into one of said cores is at least partially coupled into a core other than said one of said cores, wherein the coupled portion represents at least one of the wavelengths in the multi-wavelength optical beam.

5. A wavelength division multiplexing device, comprising:

a cladding having an index of refraction;

a plurality of cores surrounded by said cladding, said cores having respective indices of refraction, the index of refraction of said cladding being lower than the indices of refraction of said cores to confine optical beams to said cores, said cores permitting the optical beams to be coupled from at least one of said cores to at least another of said cores, said cores having respective first and second ends;

faces formed on said first and second ends of said cores and oriented with respect to said cores such that at least one of the optical beams is refracted sufficiently strongly at at least one of said faces to allow the optical beams to be spatially resolved away from at least one of said first and second ends, wherein said faces comprise input ports and output ports; and single-core fibers for imaging the optical beams into and out of said input ports and said output ports.

6. The optical fiber of claim 5, further comprising lenses between said single-core fibers and said ports for focusing the optical beams.

7. A coupling device, comprising:

a fiber, said fiber including:

a cladding having an index of refraction;

a plurality of cores surrounded by said cladding, said cores having respective indices of refraction, the index of refraction of said cladding being lower than the indices of refraction of said cores to confine optical beams to said cores, said cores permitting the optical beams to be coupled from at least one of said cores to at least another of said cores, said cores having respective first and second ends; and faces formed on at least one of said first and second ends of said cores, said faces oriented with respect to said cores such that at least one of the optical beams is refracted sufficiently strongly at at least one of said faces to allow the optical beams to be spatially resolved away from said at least one end;

at least one optical source for generating the optical beams; and at least one detector for detecting the optical beams after the optical beams exit said fiber, wherein said fiber, said at least one optical source, and said at least one detector form the coupling device.

8. A coupling device, comprising:

a cladding having an index of refraction;

a plurality of cores surrounded by said cladding, said cores having respective indices of refraction, the index of refraction of said cladding being lower than the indices of refraction of said cores to confine one or more optical beams to said cores, said cores permitting the optical beams to be coupled from at least one of said cores to at least another of said cores, said cores having respective first and second ends;

faces formed on at least one of said first and second ends of said cores, said faces oriented with respect to said cores permitting at least one optical beam to be refractively coupled into at least one of said cores through at least one of said faces;

at least one optical source for generating the optical beam; and at least one detector for detecting optical beams exiting said fiber, wherein said fiber, said at least one optical source, and said at least one detector form the coupling device.

9. An optical sensor, comprising:

a fiber, said fiber including:

a cladding having an index of refraction;

a plurality of cores surrounded by said cladding, said cores having respective indices of refraction, the index of refraction of said cladding being lower than the indices of refraction of said cores to confine optical beams to said cores, said cores permitting the optical beams to be coupled from at least one of said cores to at least another of said cores, said cores having respective first and second ends; and faces formed on at least one of said first and second ends of said cores, said faces oriented with respect to said cores such that at least one of the optical beams is refracted sufficiently strongly at at least one of said faces to allow the optical beams to be spatially resolved away from said at least one end;

at least one optical source for generating the optical beams; and at least one detector for detecting the optical beams after the optical beams exit said fiber, wherein said fiber, said at least one optical source, and said at least one detector form the optical sensor.

10. An optical sensor, comprising:

a cladding having an index of refraction;

a plurality of cores surrounded by said cladding, said cores having respective indices of refraction, the index of refraction of said cladding being lower than the indices of refraction of said cores to confine one or more optical beams to said cores, said cores permitting the optical beams to be coupled from at least one of said cores to at least another of said cores, said cores having respective first and second ends;

faces formed on at least one of said first and second ends of said cores, said faces oriented with respect to said cores permitting at least one optical beam to be refractively coupled into at least one of said cores through at least one of said faces;

at least one optical source for generating the optical beam; and at least one detector for detecting optical beams exiting said fiber, wherein said fiber, said at least one optical source, and said at least one detector form the optical sensor.

11. A method of imaging optical radiation, comprising:

providing an optical fiber having a cladding and a plurality of cores surrounded by the cladding, said cladding and said cores having respective indices of refraction, wherein the index of refraction of the cladding is lower than the indices of refraction of the cores to confine optical beams to within the cores, the cores having respective ends with faces thereon, the faces on at least one end of each of the cores being oriented with respect to the cores such that optical beams are refracted at the faces in different directions, allowing the optical beams to be spatially resolved in the far field;

providing an optical source at an end of the fiber; and coupling an optical beam of a discrete wavelength into one of the cores, in which the optical beam of a discrete wavelength is partially coupled into another of the cores as it propagates through the optical fiber.

12. A method of imaging optical radiation, comprising:

providing an optical fiber having a cladding and a plurality of cores surrounded by the cladding, said cladding and said cores having respective indices of refraction, wherein the index of refraction of the cladding is lower than the indices of refraction of the cores to confine optical beams to within the cores, the cores having respective ends with faces thereon, the faces on at least one end of each of the cores being oriented with respect to the cores such that optical beams are refracted at the faces in different directions, allowing the optical beams to be spatially resolved in the far field;

providing an optical source at an end of the fiber; and coupling an optical beam of a plurality of wavelengths into one of the cores, in which a portion of the optical beam represented by at least one of the wavelengths is at least partially coupled into a core other than the core into which the optical beam is coupled.

* * * * *